US008810727B1

(12) United States Patent
Bernard et al.

(10) Patent No.: US 8,810,727 B1
(45) Date of Patent: Aug. 19, 2014

(54) METHOD FOR SCALING CHANNEL OF AN IMAGE

(71) Applicant: Zoran (France) S.A., Neuilly-sur-Seine (FR)

(72) Inventors: Christophe Bernard, London (GB); Vincent Varoquaux, Palaiseau (FR); Marc De Vulpillieres, Paris (FR)

(73) Assignee: Qualcomm Technologies, Inc., San Diego, CA (US)

( * ) Notice: Subject to any disclaimer, the term of this patent is extended or adjusted under 35 U.S.C. 154(b) by 0 days.

(21) Appl. No.: 13/888,810

(22) Filed: May 7, 2013

(51) Int. Cl.
*H04N 11/20* (2006.01)
(52) U.S. Cl.
USPC .......................................................... 348/453
(58) Field of Classification Search
USPC ......... 348/453, 441, 448, 450, 458, 459, 725, 348/552
See application file for complete search history.

(56) References Cited

U.S. PATENT DOCUMENTS

| | | | | |
|---|---|---|---|---|
| 5,410,621 A * | 4/1995 | Hyatt | ............................ | 382/260 |
| 7,129,987 B1 * | 10/2006 | Westwater | .................... | 348/441 |
| 7,149,262 B1 * | 12/2006 | Nayar et al. | .................. | 375/341 |
| 7,705,889 B2 * | 4/2010 | Tabatabai et al. | .......... | 348/220.1 |
| 8,345,158 B2 * | 1/2013 | Robertson et al. | ............ | 348/459 |
| 8,452,122 B2 * | 5/2013 | Hitomi et al. | ................. | 382/275 |
| 2009/0193473 A1 * | 7/2009 | Moon et al. | ..................... | 725/81 |
| 2010/0026885 A1 * | 2/2010 | Terada et al. | ................. | 348/441 |

* cited by examiner

*Primary Examiner* — Paulos M Natnael
(74) *Attorney, Agent, or Firm* — Vorys, Sater, Seymour and Pease LLP; Vincent M DeLuca

(57) ABSTRACT

A method for scaling a first channel of an image. The method comprises computing a low resolution second channel of the image based on a transformation of the second channel with a transformation function used to transform a high resolution channel into a low resolution channel; computing a correlation function between the low resolution second channel and the first channel; determining a predicted second channel having the high resolution from the low resolution second channel according to a prediction method; computing a high-pass second channel based on the difference between the second channel and the predicted second channel and based on the correlation function; and determining a predicted first channel having the high resolution from the first channel according to the prediction method.

7 Claims, 4 Drawing Sheets

METHOD FOR SCALING CHANNEL OF AN IMAGE

BACKGROUND OF THE INVENTION

The present invention relates to the image and video enhancements domain, especially when the "chroma" component and the "luma" component are not in the same resolution.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Most video content received in a TV is encoded in luma and chroma channels, most typically one luma channel Y and two chroma channels Cb and Cr. Most of the time, it is possible to sample the Y channel at full resolution, and to sample the chroma channels at reduced resolution.

Classical chroma sampling formats are:
  4:2:2 where the chroma channels are sub sampled horizontally by a factor of two.
  4:2:0 where the chroma channels are sub sampled both horizontally and vertically by a factor of 2. The number of chroma samples for each channel Cb or Cr is then 4 times less than in the luma channel.

Thus there is a need, in such situation, to increase the resolution of the chroma channels to match the resolution of the luma channel, so to produce a chroma sampling format of 4:4:4. This increase in resolution is to be done with the highest possible video quality.

The most common way to address this problem is to simply linearly upscale the chroma channels. Thus, the interpolation filters used for computing chroma samples are fixed (for example Lanczos scaling).

Additionally, some sharpening of the chroma transitions can be done with various methods.

Nevertheless, such methods have drawbacks.

For example, some visual artifact could be detected. A typical artifact is for example visible at the boundary between 2 regions of substantially different colors where usually some "bleeding" occurs because on few pixels, the image has a color different from either of the 2 regions. Other artifacts are a general lack of sharpness or of saturation on sharp contours of colorful contents.

Thus there is a need to improve the chroma sharpness, and to obtain a better image quality while increasing the scale of the chroma components.

SUMMARY OF THE INVENTION

The invention relates to a method for scaling a first channel of an image. The method comprises:
  receiving the first channel and a second channel of the image, the first channel having a low resolution and the second channel having a high resolution;
  computing a low resolution second channel based on a transformation of the second channel with a transformation function used to transform a channel having the high resolution into a channel having the low resolution;
  computing a correlation function between the low resolution second channel and the first channel;
  determining a predicted second channel having the high resolution from the low resolution second channel according to a prediction method;
  computing a high-pass second channel based on the difference between the second channel and the predicted second channel, and based on the correlation function;
  determining a predicted first channel having the high resolution from the first channel according to the prediction method;
  determining a scaled first channel based on the predicted first channel and the high-pass second channel.

For instance, the first channel ($C_{low}$) may be a chroma channel and the second channel (Y) may be a luma channel.

The low resolution may induce that the associated bandwidth is two or four times smaller compared to the high resolution bandwidth. In one embodiment, the high resolution may correspond to a resolution 1920×1080 pixels and the low resolution may correspond to a resolution of 960×540 pixels.

A prediction method (or interpolation method) is a method to upscale images from a lower resolution to a higher resolution. This method may use a linear interpolation method or any other interpolation method.

In one embodiment, the scaled first channel (C) may be a sum of the predicted first channel ($[\text{Pred } C_{low}]$) and the high-pass second channel ($C_{high}$).

In one embodiment, the high-pass second channel $C_{high}$ is a multiplication of:
  the difference between the second channel Y and the predicted second channel $[\text{Pred } Y_{low}]$ (noted $Y_{high}$), and
  the correlation function $\alpha(n,m)$.

According to a possible embodiment, the method may further comprise modifying values of the correlation function based on the computation of regression estimation $r^2$.

Indeed, regression estimation $r^2$ (or also referred by "coefficient of determination") is often a number between 0 and 1. It describes how well a regression fits a set of data.

If $r^2$ is close to 1, it may indicate that the regression line fits the data well.

If $r^2$ is close to 0, it may indicate that the regression line does not fit the data well.

It may be seen as the proportion of variability in a data set that is accounted for by the statistical model. It may provide a measure of how well values are likely to be predicted by the model.

For instance, if the regression estimation $r^2$ is low, it may be advantageous to reduce the values of the correlation function in order to avoid any visible artifacts.

One possible way to do it, is to multiply the values of the correlation function with $F(r^2)$ where $F(\cdot)$ is a monotonically increasing function. The value of F may be comprised between 0 and 1. F may be the identity function.

In addition, the method may further comprise decreasing, clamping, or setting to zero at least one value of the correlation function if the at least one value is greater than a predetermined threshold.

It may avoid any high value of the correlation function.

One possible way to do it, is to compute $\alpha'(n,m)=G(\alpha(n,m))$ where $G(\cdot)$ is a monotonically increasing function. The value of G may be comprised between 0 and 1.

In one embodiment, the first channel may comprises points, each point having coordinates in a set of coordinates $\{(n,m)\}$.

The low resolution second channel may then comprise points, each point being in correspondence with a point of the first channel.

"Computing a correlation function between the low resolution second channel and the first channel" may then comprise, for each point of coordinates (n,m) in the set {(n,m)}:
   determining a subset of points having coordinates within a predetermined distance from the point of coordinates (n,m);
   within said subset, computing a correlation value α(n,m) based on a correlation of variations of the low resolution second channel with variations of the first channel.

Then a local correlation value may be computed for each point (n,m) in the set of coordinates.

The above "distance" is to be understood in the broadest mathematical interpretation. For instance, the distance between point $(x_1, x_2)$ and point $(y_1, y_2)$ may be a Euclidian distance $$\sqrt{\sum_{i=1}^{2} |x_i - y_i|},$$

or any other distance associated with a norm (e.g. $\max(|x_i - y_i|)_{i=1...2}$).

The variations may be computed according to a horizontal direction.

Indeed, as the video image may be transmitted line by line, it may be easier to compute the variation according to these lines. Moreover, the size of the memory used to compute such variation could be smaller.

Another aspect of the invention relates to a device for scaling a first channel of an image. The device comprises:
   an input interface for receiving the first channel and a second channel of the image, the first channel having a low resolution and the second channel having a high resolution;
   a circuit for computing a low resolution second channel based on a transformation of the second channel with a transformation function used to transform a channel having the high resolution into a channel having the low resolution;
   a circuit for computing a correlation function between the low resolution second channel and the first channel;
   a circuit for determining a predicted second channel having the high resolution from the low resolution second channel according to a prediction method;
   a circuit for computing an high-pass second channel based on the difference between the second channel and the predicted second channel and based on the correlation function;
   a circuit for determining a predicted first channel having the high resolution from the first channel according to the prediction method;
   a circuit for determining a scaled first channel based on the predicted first channel and the high-pass second channel.

Yet another aspect of the invention relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

In the following description, luma component is noted Y(n,m) where n and m are integers spanning the image limits. For instance for a full HD video frame, m would be in the interval [0,1919] and n would be in the interval [0,1079].

In the following description, the chroma components $C_b$ and $C_r$ are, for simplification only and for the purpose of the examples, sampled with a twice lower resolution than the luma component, e.g. $C_{b,low}(2n,2m)$ and $C_{r,low}(2n,2m)$ where m is in the full HD frame case in [0,959] and n in [0,539].

In addition, the indices "low" indicates that the information on $C_b$ and $C_r$ which is carried in these components are substantially of a lower definition (i.e. narrower bandwidth) than in the luma component Y.

In the following description, when referring to the chroma component/channel C, it may either refers to the component $C_b$ or refers to the component $C_r$ or any other chroma component. Then $C_{low}(2n,2m)$ may be understood as $C_{b,low}$ or $C_{r,low}$.

Figure 1A:
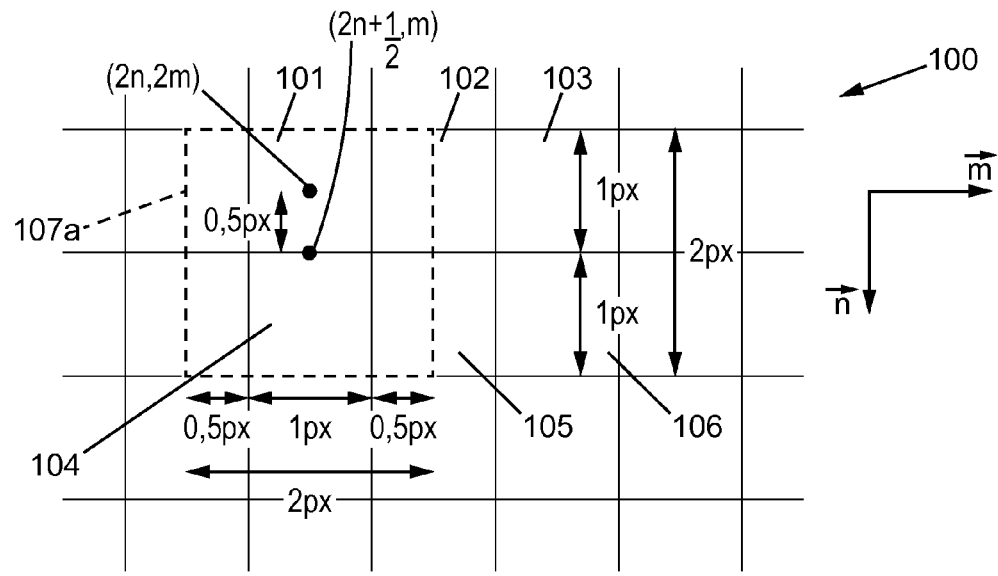
FIGS. 1a and 1b describe standard alignments between the chroma channels and the luma channel.

FIG. 1a is an example a first method to subsample a chroma channel by a factor 2 according to the vertical direction and according to the horizontal direction.

In this figure, the display 100 is split in a plurality of pixels 101, 102 ... 106 ... (i.e. pixels grid). Each pixel has a 1px width and a 1px height. In order to compute the chroma value, it is possible to compute a mean of the chroma value within a 2px-2px window 107a. According to this specific embodiment, chroma channel is not located in correspondence with (i.e. aligned with) the pixels grid of the display, whereas the luma channel Y is.

Alignment of luma and chroma samples is specified in the various video formats.

For instance, FIG. 1a describe a standard alignment used for 4:2:0 sampling in MPEG-2: the window 107a (for the chroma mean/alignment or C(2n,2m)) is aligned with luma channel at point with coordinates (2n+½,2m). In this case, the chroma samples are said to be "cosited" with the luma samples along the horizontal direction, and located halfway between 2 luma samples along the vertical direction (centered).

Figure 1B:
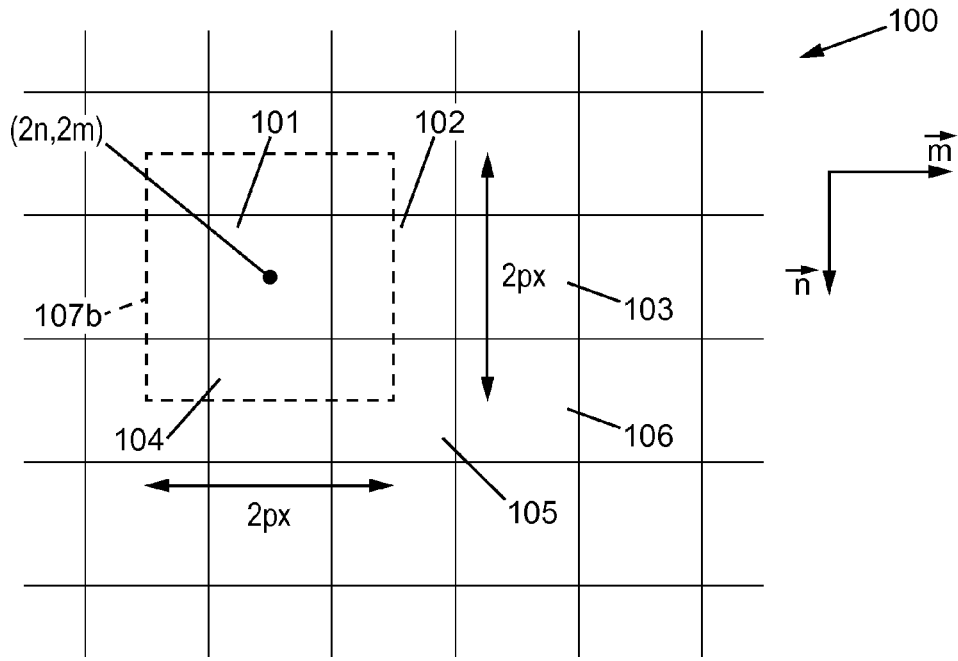

FIG. 1b is an example a second method to subsample a chroma channel by a factor 2 according to the vertical direction and according to the horizontal direction.

In this example, the chroma channel and the luma channel are aligned: the window 107b (for the chroma mean/alignment or C(2n,2m)) is aligned with luma channel at point with coordinates (2n,2m).

The chroma channels $C_{low}(2n,2m)$ may be generated by filtering and sub-sampling an full-resolution chroma channel C(n,m).

The filters along the horizontal and vertical directions are called $f_H$ and $f_V$.

So $f_H$ is a discrete filter of size $N_H$ along the horizontal direction and of size 1 along the vertical direction. $f_V$ is a discrete filter of size 1 along the horizontal direction and of size $N_V$ along the vertical direction. Referring to FIG. 1a (respectively FIG. 1b), $N_H$ could be the width of the window 107a (respectively 107b) and $N_V$ could be the height of the window 107a (respectively 107b).

Hence, it is possible to write $C_{low}(2n,2m)=(C*f_H*f_V)(2n,2m)$

Referring to FIG. 1a (respectively FIG. 1b), $f_H$ would be [0.5 1 0.5] (respectively [0.5 1 0.5]), and $f_V$ would be $$\begin{bmatrix}1\\1\end{bmatrix}\left(\text{respectively}\begin{bmatrix}0.5\\1\\0.5\end{bmatrix}\right).$$

In practice, the filters $f_H$ and $f_V$ are described by standards and may be determined when receiving a new stream/image/video.

Receiving the low resolution chroma channel $C_{low}$ there is a need to recreate (or reconstruct) a complete chroma channel with the same resolution than the luma channel.

Then a reconstruction model may be used. This model may define a predictor operator denoted "Pred", this operator may be for instance a linear operator (in the classical linear algebra sense) which interpolates chroma values between defined two chroma values in $C_{low}$. It generates a predicted value for a full-resolution chroma channel.

So, if $C_{low}$ is defined for even sample indexes (2n,2m) only, [Fred $C_{low}$] is defined on all indices. For simplification purpose, it is possible to consider that $C_{low}(n,m)$ is defined for all values, even or odd values. Whenever n or m is odd, the value $C_{low}(n,m)$ is considered as being 0. When n and m are both even values, $C_{low}(n,m)$ is already well defined.

The predictor can be noted [Fred $C_{low}$](n,m)= $(C_{low}*g_H*g_V)(n,m)$.

The predictor may not be capable to reconstruct perfectly the original non-subsampled chroma channel C. Indeed, missing information may have been definitely lost in the subsampling process (i.e. $C(n,m)\#[\text{Fred } C_{low}](n,m)$).

Therefore, it may be useful to be able to determine $C(n,m)-[\text{Fred } C_{low}](n,m)=C_{high}(n,m)$ where $C_{high}(n,m)$ is carrying high-frequency details of the chroma channel that are missing from the smooth chroma channel prediction.

It is noted that the predictor used here may also be a none-linear predictor such as the one described in U.S. patent application Ser. No. 13/696,010 "TWO-DIMENSIONAL SUPER RESOLUTION SCALING" and in U.S. patent application Ser. No. 13/697,938 "IMAGE INTERPOLATION METHOD WITH DECISION MIXING".

Figure 2:
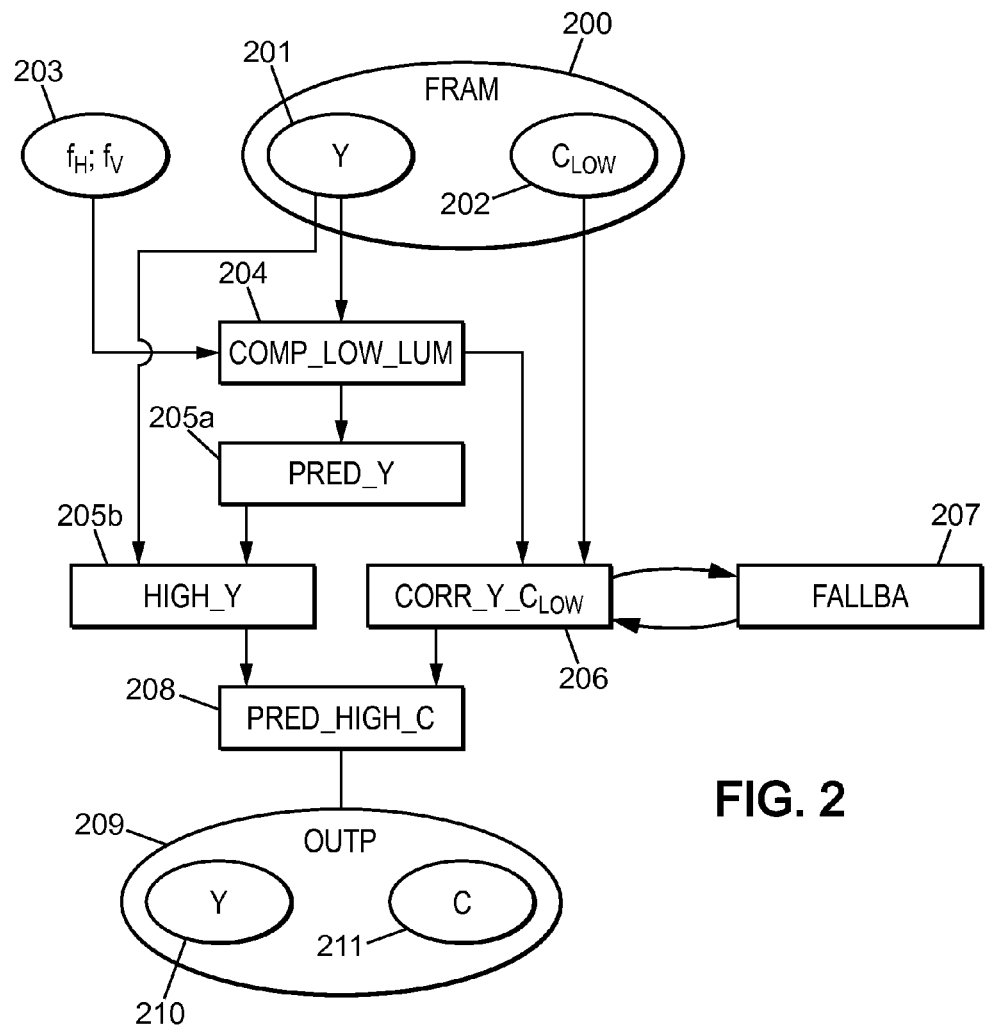
FIG. 2 is a flowchart of a possible chroma up-scaling according to a possible embodiment of the invention

FIG. 2 is a flowchart of a possible chroma up-scaling according to a possible embodiment of the invention.

When receiving a frame 200 of a video (or a standalone image), it is possible to determine the luma channel Y 201 and at least one chroma channel $C_{low}$ 202, the chroma channel having a lower resolution than the luma channel.

The transformation filters 203 used to compute the chroma channel (i.e. the sub-sampling functions/filters) may be determined or received at the same moment.

Thus, it is possible to compute (step 204) a sub-sampled version of the luma channel, by applying the sub-sampling filters 203 to the received luma channel $Y_{low}(2n,2m)= (Y*f_H*f_V)(2n,2m)$.

As detailed above, it is also possible to compute (step 205a), from the sub-sampled version of the luma channel $Y_{low}$, a smooth prediction of the luma channel: [Pred $Y_{low}$](n,m)=$(Y_{low}*g_H*g_V)(n,m)$. The values of $Y_{low}(n,m)$, if n or m is odd, may be set to 0.

Then, the luma high-pass value is computed (step 205b) $Y_{high}(n,m)=Y(n,m)-[\text{Pred } Y_{low}](n,m)$.

It is then possible to compute (step 206) a correlation function $\alpha(n,m)$ between the variation of $Y_{low}$ and $C_{low}$. Indeed, heuristically, the local chroma variations and the local luma variations may be assumed to be correlated.

The following paragraphs detail a possible correlation technique to determine $\alpha(n,m)$.

For each pair of indices (n,m), a window $W_{n,m}$ is defined as being the set $W_{n,m}=\{(u,v): u$ is an even value, $v$ is an even value, $|u-n|<d|v-m|<d\}$.

Figure 3:
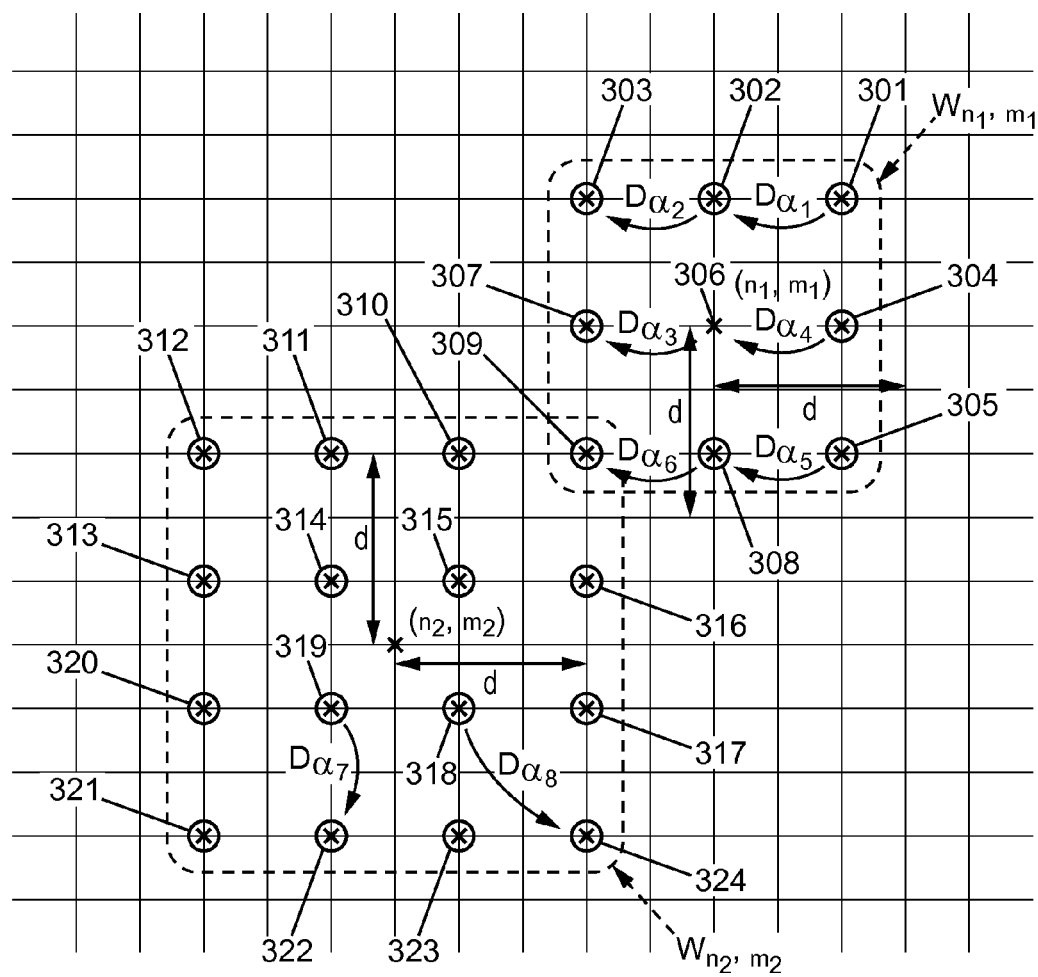
FIG. 3 presents a possible way to compute a windowed local correlation according to an horizontal direction.

For instance, and in reference to FIG. 3, the set of points 301 to 309 is $W_{n1,m1}$ and the set of points 309 to 324 is $W_{n2,m2}$ with d=3.

For all points (u,v) of each set $W_{n,m}$, it is possible to perform a local regression to fit the following model ($C_{low}(u,v)-C_{low}(u-2,v)=\alpha(Y_{low}(u,v)-Y_{low}(u-2,v))$. This regression may use a least square method. In consequence, for each (n,m), a regression value of the correlation coefficient $\alpha$ is computed and is called $\alpha(n,m)$.

In this above example, the correlation coefficient is obtained by correlating horizontal differences of the $C_{low}$ and $Y_{low}$ images (i.e. according to the direction $D\alpha_1\ldots D\alpha_6$). Any other high-pass subband computed on these images (such as the ones that can be derived from a step of a 2D wavelet transform) could be used instead. In addition, the correlation coefficient may be also obtained by correlating vertical differences (i.e. according to the direction $D\alpha_7$ for instance), by correlating diagonal differences (i.e. according to the direction $D\alpha_8$ for instance), or a combination of such directions or correlations.

It is also possible to modify (step 207) the correlation computed in step 206 if it is assumed that the there is a risk to correlate the luma channel and the chroma one. For instance, the system may be able to detect that, actually, no correlation (or a very little one) between luma and chroma exists. In this case, it preferable to switch to a fallback solution, because the odds that artifacts were introduce are high.

For instance $\alpha(n,m)$ is then set to 0.

In an alternative option, a coefficient of determination $r^2(n,m)$ may be computed. This coefficient of determination can be used to reduce/modify the correlation coefficient $\alpha(n,m)$: $\alpha(n,m)$ may be set to $F(r^2(n,m))\cdot\alpha(n,m)$, where F may be, for instance the identity function $F(x)=x$.

In an other alternative option, if $\alpha(n,m)$ is substantially larger than 1, there could be a risk to amplify substantially noise. A clamping of $\alpha(n,m)$ may be computed to avoid this risk.

Once $\alpha(n,m)$ is defined as described above, it is possible to compute $C_{high}(n,m)=\alpha(n,m)Y_{high}(n,m)$ (step 208).

Then, the final reconstructed frame 209 may then be outputted with the initial luma channel 210 and the reconstructed chroma channel(s) 211. This reconstructed chroma channel is $C(n,m)=[\text{Pred } C_{low}](n,m)+C_{high}(n,m)$ with [Pred $C_{low}](n,m)=(C_{low}*g_H*g_V)(n,m)$.

Part of the flow chart of FIG. 2 can represent steps of an example of a computer program which may be executed.

Figure 4:
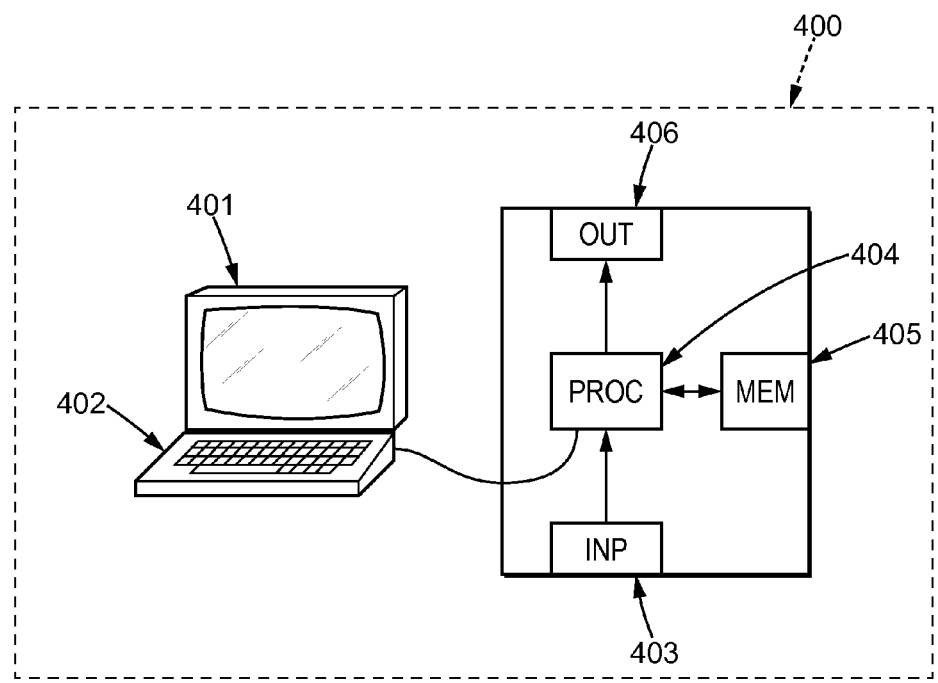
FIG. 4 is a possible embodiment for a device that enables the present invention.

FIG. 4 is a possible embodiment for a device that enables the present invention.

In this embodiment, the device 400 comprise a computer, this computer comprising a memory 405 to store program instructions loadable into a circuit and adapted to cause circuit 404 to carry out the steps of the present invention when the program instructions are run by the circuit 404.

The memory 405 may also store data and useful information for carrying the steps of the present invention as described above.

The circuit 404 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for <<Field-Programmable Gate Array>>).

This computer comprises an input interface 403 for the reception of data used for the above method according to the invention and an output interface 406 for providing a reconstructed image.

To ease the interaction with the computer, a screen 601 and a keyboard 602 may be provided and connected to the computer circuit 604.

A person skilled in the art will readily appreciate that various parameters disclosed in the description may be modified and that various embodiments disclosed may be combined without departing from the scope of the invention.

For instance, if the luma channel of the image/frame has a lower resolution than a chroma channel, the same method may be executed in order to increase the resolution of the luma channel.

What is claimed is:

1. A method for scaling a first channel of an image, wherein the method comprises:
   - receiving the first channel and a second channel of the image, the first channel having a low resolution and the second channel having a high resolution;
   - computing a low resolution second channel based on a transformation of the second channel with a transformation function used to transform a channel having the high resolution into a channel having the low resolution;
   - computing a correlation function between the low resolution second channel and the first channel;
   - determining a predicted second channel having the high resolution from the low resolution second channel according to a prediction method;
   - computing a high-pass second channel based on the difference between the second channel and the predicted second channel and based on the correlation function;
   - determining a predicted first channel having the high resolution from the first channel according to the prediction method; and
   - determining a scaled first channel based on the predicted first channel and the high-pass second channel.

2. A method according to claim 1, wherein the method further comprises:
   - modifying values of the correlation function based on the computation of a regression estimation.

3. A method according to claim 1, wherein the method further comprises:
   - decreasing, clamping, or setting to zero at least one value of the correlation function if the at least one value is greater to a predetermined threshold.

4. A method according to claim 1, wherein the first channel comprises points, each point having coordinates in a set of coordinates $\{(n,m)\}$, wherein the low resolution second channel comprises points, each point being in correspondence with a point of the first channel,
and wherein computing a correlation function between the low resolution second channel and the first channel comprises, for each point of coordinates $(n,m)$ in the set $\{(n,m)\}$:
   - determining a subset of points having coordinates within a predetermined distance from the point of coordinates $(n,m)$;
   - within said subset, computing a correlation value $\alpha(n,m)$ based on a correlation of variations of the low resolution second channel with variations of the first channel.

5. A method according to claim 4, wherein the variations are computed according to a horizontal direction.

6. A device for scaling a first channel of an image, wherein the device comprises:
   - an input interface for receiving the first channel and a second channel of the image, the first channel having a low resolution and the second channel having a high resolution;
   - a circuit for computing a low resolution second channel based on a transformation of the second channel with a transformation function used to transform a channel having the high resolution into a channel having the low resolution;
   - a circuit for computing a correlation function between the low resolution second channel and the first channel;
   - a circuit for determining a predicted second channel having the high resolution from the low resolution second channel according to a prediction method;
   - a circuit for computing an high-pass second channel based on the difference between the second channel and the predicted second channel and based on the correlation function;
   - a circuit for determining a predicted first channel having the high resolution from the first channel according to the prediction method; and
   - a circuit for determining a scaled first channel based on the predicted first channel and the high-pass second channel.

7. A non-transitory computer readable storage medium for scaling a first channel of an image, having stored thereon a computer program comprising program instructions, the computer program being loadable into a data-processing unit and adapted to cause the data-processing unit to carry out the steps, when the computer program is run by the data-processing device;
   - receiving the first channel and a second channel of the image, the first channel having a low resolution and the second channel having a high resolution;
   - computing a low resolution second channel based on a transformation of the second channel with a transformation function used to transform a channel having the high resolution into a channel having the low resolution;
   - computing a correlation function between the low resolution second channel and the first channel;
   - determining a predicted second channel having the high resolution from the low resolution second channel according to a prediction method;
   - computing a high-pass second channel based on the difference between the second channel and the predicted second channel and based on the correlation function;
   - determining a predicted first channel having the high resolution from the first channel according to the prediction method; and determining a scaled first channel based on the predicted first channel and the high-pass second channel.

* * * * *